M. BIRKIGT.
CONNECTING ROD.
APPLICATION FILED JAN. 4, 1916.
1,227,371.
Patented May 22, 1917.
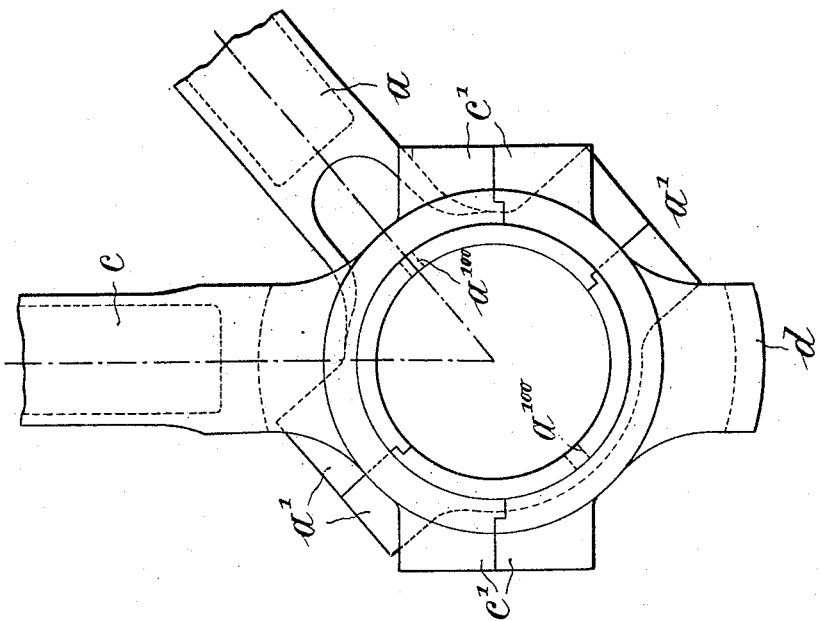
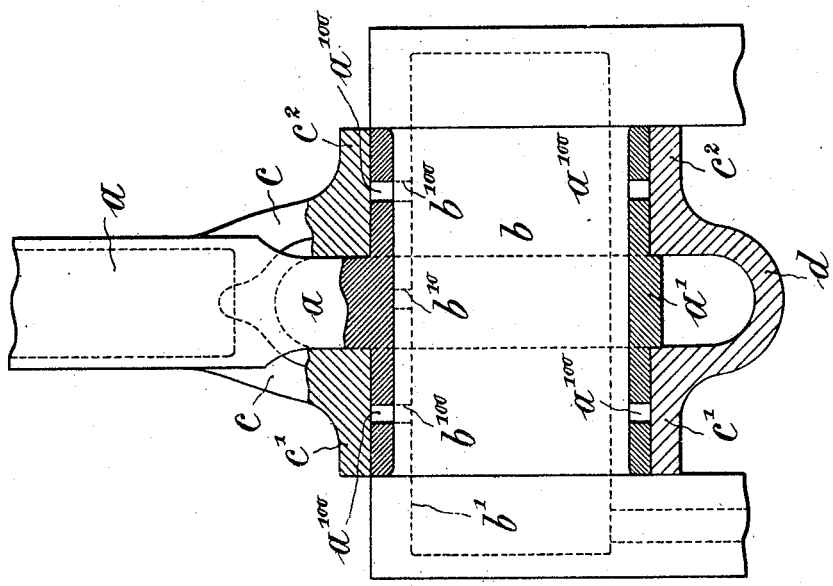
Witnesses
Inventor
Marc Birkigt
by
James L. Norris,
Attorney.

UNITED STATES PATENT OFFICE.

MARC BIRKIGT, OF BOIS COLOMBES, FRANCE.

CONNECTING-ROD.

1,227,371.  Specification of Letters Patent.  Patented May 22, 1917.

Application filed January 4, 1916. Serial No. 70,257.

*To all whom it may concern:*

Be it known that I, MARC BIRKIGT, engineer, citizen of the Republic of Switzerland, residing at Bois Colombes, Department of Seine, France, have invented certain new and useful Improvements in Connecting-Rods, of which the following is a specification.

This invention relates to connecting rods and more particularly to those for V-engines.

This invention has for its object to provide connecting rods which are of great strength, occupying less space and working better than those hitherto designed.

The invention consists in connecting two connecting or piston rods, the axes of which are situated and move in one and the same plane, to a crank-pin, one of the connecting rods having a sleeve provided on an end thereof to be fitted upon and encircle the crank-pin, and the other connecting rod having an enlarged bifurcated end straddling or embracing the end of the first mentioned connecting rod, and each of the bifurcated portions being formed with a suitable sleeve portion surrounding the sleeve of the first rod. The invention further consists in providing, when forced lubrication is supplied through the axis of the crank, a certain number of openings in the sleeve secured to the first connecting rod in planes normal to the axis of the crank, in which are also provided radial openings in the body thereof to register with the openings of the sleeve.

The invention comprises certain other arrangements which will be more explicitly referred to hereinafter.

The invention will be understood from the following description as well as from the accompanying drawing, in which—

Figure 1 shows in axial section the enlarged ends of two connecting rods mounted on the crank of a V-engine.

Fig. 2 is a front elevation of the enlarged ends of the connecting rods.

One of the connecting rods $a$ is built in a known manner, so that its enlarged end comprises a sleeve $a^1$ in two parts, adapted to surround the crank-pin $b$.

The other connecting rod $c$ which is situated and moves in the same plane as the connecting rod $a$, has an enlarged bifurcated end forming the two branches $c^1$, $c^2$, each of the said branches terminating in a sleeve portion, adapted to surround the sleeve $a^1$ of the connecting rod $a$ and on opposite sides thereof.

But in accordance with the invention, in order to avoid the tendency of the two branches $c^1$ and $c^2$ of the connecting rod $c$ from moving apart, a bridge part $d$ connects the two branches and is preferably integral therewith. It is to be understood that the sleeve portions of both rods $a$ and $c$ may be formed of complemental sections, as shown in the drawings, which will facilitate the assembling of various parts.

Moreover, if the engine has a forced lubrication with supply of lubricant through a conduit $b^1$ provided in the axis of the crank-pin, and through a radial conduit $b^{10}$ also provided in the said crank, the following arrangement is adopted for lubricating the second connecting rod.

In two planes arranged symmetrically of the axis of the connecting rod $a$, and normally to the axis of the crank-pin $b$, is provided in the crank a radial hole $b^{100}$, and in the same planes is provided one or more holes $a^{100}$ in the sleeve secured to the connecting rod $a$; owing to which, the lubricant will be able to get between the sleeves $a^1$ and $c^1$, $c^2$.

The width of the connecting rod $a$ may be slightly reduced near its big end, which enables the space occupied by the big ends of the connecting rods to be reduced.

It is obvious that the invention is not limited to the methods of carrying it out, which have been described, but comprises any modifications within the scope of the claims.

Having now particularly described and ascertained the nature of my said invention and in what manner the same is to be performed, I declare that what I claim is:—

1. The combination, with a crank-pin; of a pair of connecting rods associated therewith and arranged for movement in the same plane, one rod being provided with a sleeve which fits over the crank-pin, and the other rod with a transversely-bifurcated sleeve whose component members are disposed in spaced parallel relation to each other on opposite sides of the first-named rod and fit over the first-named sleeve; each of said sleeves comprising an inner section which is integral with the corresponding rod, and an outer section which is separably fastened thereto; and a rigid bridge-piece connecting the separable outer sections of the two members of the second-named sleeve.

2. The combination, with a crank-pin having an axial lubricant conduit and radial passages communicating therewith; of a pair of connecting rods associated with said crank-pin and arranged for movement in the same plane, one rod being provided with a laterally-extending sleeve which fits over the crank-pin and is formed with openings in its walls in register with said passages, and the other rod being provided with a transversely bifurcated sleeve whose component members are disposed in spaced parallel relation to each other on opposite sides of the first-named rod and fit over the first-named sleeve; and a rigid bridge-piece connecting the outer end portions of the two members of the second-named sleeve.

In testimony whereof I have hereunto set my hand in presence of two subscribing witnesses.

MARC BIRKIGT.

Witnesses:
CHAS. P. PRESSLY,
PAUL BLUM.

Copies of this patent may be obtained for five cents each, by addressing the "Commissioner of Patents, Washington, D. C."